(12) United States Patent
Schmitt

(10) Patent No.: US 11,999,054 B2
(45) Date of Patent: Jun. 4, 2024

(54) GRIPPER FOR A LABORATORY CONTAINER SORTING DEVICE

(71) Applicant: Roche Diagnostics Operations, Inc., Indianapolis, IN (US)

(72) Inventor: Norbert Schmitt, Lucerne (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 265 days.

(21) Appl. No.: 17/304,806

(22) Filed: Jun. 25, 2021

(65) Prior Publication Data
US 2022/0009110 A1    Jan. 13, 2022

(30) Foreign Application Priority Data

Jul. 10, 2020    (EP) .................................... 20185119

(51) Int. Cl.
| | |
|---|---|
| *B25J 15/06* | (2006.01) |
| *B25J 9/02* | (2006.01) |
| *B25J 9/16* | (2006.01) |
| *B25J 15/08* | (2006.01) |

(52) U.S. Cl.
CPC ........... *B25J 15/0666* (2013.01); *B25J 9/023* (2013.01); *B25J 9/1697* (2013.01); *B25J 15/08* (2013.01)

(58) Field of Classification Search
CPC ........ B25J 15/0666; B25J 15/08; B25J 9/023; B25J 9/1697
USPC ............................................ 294/183, 119.1
See application file for complete search history.

(56) References Cited

U.S. PATENT DOCUMENTS

| | | | | | |
|---|---|---|---|---|---|
| 2,341,521 | A | * | 2/1944 | Baker | ................... B65H 3/0883 |
| | | | | | 271/103 |
| 2,995,359 | A | * | 8/1961 | Gulick | .................... B65G 59/04 |
| | | | | | 271/103 |
| 4,266,905 | A | * | 5/1981 | Birk | .................... B65G 47/1485 |
| | | | | | 901/45 |
| 4,787,812 | A | * | 11/1988 | Gopfert | ................... B66C 23/54 |
| | | | | | 414/737 |

(Continued)

FOREIGN PATENT DOCUMENTS

| | | |
|---|---|---|
| CN | 108942870 A | 12/2018 |
| CN | 208882942 U | 5/2019 |

(Continued)

OTHER PUBLICATIONS

European Search Report dated Nov. 30, 2020, in Application No. 20185119.3. 2 pp.

*Primary Examiner* — Paul T Chin
(74) *Attorney, Agent, or Firm* — Woodard, Emhardt, Henry, Reeves & Wagner, LLP

(57) ABSTRACT

A gripper for a laboratory container sorting device includes a vacuum gripper and a mechanical gripper. The vacuum gripper includes a suction cup and is configured to move the suction cup between a pickup position and a transfer position. The suction cup is configured to pick up a laboratory container when the suction cup is in the pickup position and to transfer the laboratory container when the suction cup is in the transfer position. The mechanical gripper is configured to grip and release the laboratory container when the suction cup is in the transfer position. A laboratory container sorting device, a laboratory system, and a method of operating the laboratory system are also disclosed.

14 Claims, 4 Drawing Sheets

(56) References Cited

U.S. PATENT DOCUMENTS

| | | | | |
|---|---|---|---|---|
| 5,207,465 | A | * | 5/1993 | Rich .................. H05K 13/0408 |
| | | | | 294/2 |
| 5,267,449 | A | * | 12/1993 | Kiczek .................... F25B 9/004 |
| | | | | 62/93 |
| 8,267,449 | B2 | * | 9/2012 | Maffeis .................. B65G 47/91 |
| | | | | 294/183 |
| 10,509,047 | B2 | | 12/2019 | Pedain |
| 10,864,641 | B2 | * | 12/2020 | Leidenfrost ............ B25J 15/106 |
| 11,084,175 | B2 | * | 8/2021 | Polido .................. B25J 15/0061 |
| 11,504,862 | B1 | * | 11/2022 | Wieckowski ............ B25J 9/144 |
| 2019/0047156 | A1 | | 2/2019 | Curhan et al. |
| 2020/0078939 | A1 | * | 3/2020 | Jeong ..................... B25J 9/1697 |

FOREIGN PATENT DOCUMENTS

| | | | |
|---|---|---|---|
| CN | 111113393 | A | 5/2020 |
| EP | 2148204 | B1 | 1/2010 |
| EP | 2988134 | A1 | 2/2016 |
| EP | 2566787 | B1 | 3/2016 |
| EP | 3070479 | B1 | 7/2019 |
| WO | 2020/072815 | A1 | 4/2020 |

* cited by examiner

GRIPPER FOR A LABORATORY CONTAINER SORTING DEVICE

CROSS-REFERENCE TO RELATED APPLICATIONS

This application claims priority to European Patent Application No. 20185119.3, filed Jul. 10, 2020, the disclosure of which is hereby incorporated by reference in its entirety.

TECHNICAL FIELD

The present disclosure relates to automated in vitro diagnostic laboratory testing and, in particular, to a gripper for a laboratory container sorting device, a laboratory container sorting device, a laboratory system, and a method of operating the laboratory system.

BACKGROUND

In diagnostic laboratory environments, laboratory containers like test sample containers, test reagent containers, or laboratory consumable containers are transported between multiple areas and/or stations according to predefined laboratory workflows. For example, laboratory containers are received at a reception area where they are sorted and held temporarily before dispatch into laboratory areas. Within the laboratory areas, the laboratory containers are transported between multiple stations such as pre-analytical, analytical and post-analytical stations in order to produce accurate and reliable test results, which represent pivotal information for physicians.

Typically, such laboratory containers are transported in one or more holding devices within diagnostic laboratory environments. Depending on the predefined laboratory workflows, laboratory containers are sorted or transferred from one holding device to another holding device based on predefined sorting criteria such as, for example, laboratory container types, test sample types, or test orders, etc. Laboratory containers may be sorted between two holding devices of a same type, e.g., laboratory containers are sorted between two laboratory container racks. And/or laboratory containers may be sorted between two holding devices of a different type, e.g., laboratory containers are sorted from a bin to a laboratory container rack or other laboratory container carriers. Sorting of laboratory containers may be done manually. But with improved throughputs, improved turn-around times, and growing test portfolios of automated diagnostic laboratory systems, the number of laboratory containers which have to be sorted is increasing. Accordingly, laboratory container sorting devices are used to sort laboratory containers efficiently and reliably in an automated manner.

U.S. Pat. No. 10,509,047 B2 and European Patent No. EP 2 148 204 B1 disclose laboratory container sorting devices comprising mechanical grippers with fingers for gripping and sorting laboratory containers. However, depending on the holding device type from which a laboratory container has to be sorted, a laboratory container may be surrounded by other laboratory containers so that such mechanical grippers may not be able to grip the laboratory container without interfering or touching the other laboratory containers causing damages or changes of their positions or orientations. This problem can be prevented by using laboratory container sorting devices comprising a vacuum gripper with a suction cup for picking up laboratory containers at one contact point of the laboratory container. Such vacuum grippers are well known in the art. However, depending on the holding devices between which a laboratory container has to be sorted and the contact point of the laboratory container at which the laboratory container is picked up by the suction cup, vacuum grippers are not able to align the laboratory container with the holding device to which the laboratory container has to be transferred as precisely as mechanical grippers allow due to the elastic and flexible material of the suction cup.

Therefore, there is a need for sorting laboratory containers in an automated, simple, and flexible way, thereby better serving the needs of automated in vitro diagnostic laboratory testing.

SUMMARY

The present disclosure refers to a gripper for a laboratory container sorting device, a laboratory container sorting device, a laboratory system, and a method of operating the laboratory system.

In accordance with one embodiment, the present disclosure relates to a gripper for a laboratory container sorting device. The gripper comprises a vacuum gripper comprising a suction cup. The vacuum gripper is configured to move the suction cup between a pickup position and a transfer position. The suction cup is configured to pick up a laboratory container when the suction cup is in the pickup position, to hold the laboratory container, and to transfer the laboratory container when the suction cup is in the transfer position. The gripper further comprises a mechanical gripper. The mechanical gripper is configured to grip and release the laboratory container when the suction cup is in the transfer position. The vacuum gripper comprises an extendable and retractable pipe with two ends. The suction cup is attached at one end and the vacuum source is operatively coupled to the other end. The extendable and retractable pipe is configured to be extended for moving the suction cup from the transfer position to the pickup position. The extendable and retractable pipe is configured to be retracted for moving the suction cup from the pickup position to the transfer position. The generated vacuum for holding the laboratory container is inside the extendable and retractable pipe and the extendable and retractable pipe is configured to be retracted by the vacuum inside the extendable and retractable pipe.

In accordance with another embodiment, the present disclosure also relates to a laboratory container sorting device. The laboratory container sorting device comprises a gripper as described herein and a cartesian positioning device. The gripper is attached to the cartesian positioning device and the cartesian positioning device is configured to position the gripper at a contact point of the laboratory container and at a release position.

In accordance with yet another embodiment, the present disclosure further relates to a laboratory system comprising a laboratory container sorting device as described herein, a laboratory container, a first holding device configured for receiving, holding, and/or releasing the laboratory container, and a second holding device configured for receiving, holding, and/or releasing the laboratory container. The laboratory container comprises the contact point when the first holding device holds the laboratory container. The second holding device provides the release position.

In accordance with still yet another embodiment, the present disclosure further relates to a method of operating a laboratory system as described herein. The method comprises the following steps:

a) positioning, by the cartesian positioning device, the gripper at the contact point of the laboratory container held by the first holding device;
b) moving, by the vacuum gripper, the suction cup to the pickup position, wherein the suction cup is positioned at the contact point of the laboratory container during step
b) if step b) is executed after step a), wherein the suction cup is positioned at the contact point of the laboratory container during step a) if step b) is executed before step a);
c) picking up, by the suction cup of the vacuum gripper, the laboratory container at the contact point;
d) moving, by the vacuum gripper, the suction cup to the transfer position;
e) gripping, by the mechanical gripper, the laboratory container when the suction cup is in the transfer position;
f) releasing, by the vacuum gripper, the laboratory container;
g) positioning, by the cartesian positioning device, the gripper at the release position of the second holding device; and
h) releasing, by the mechanical gripper, the laboratory container.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
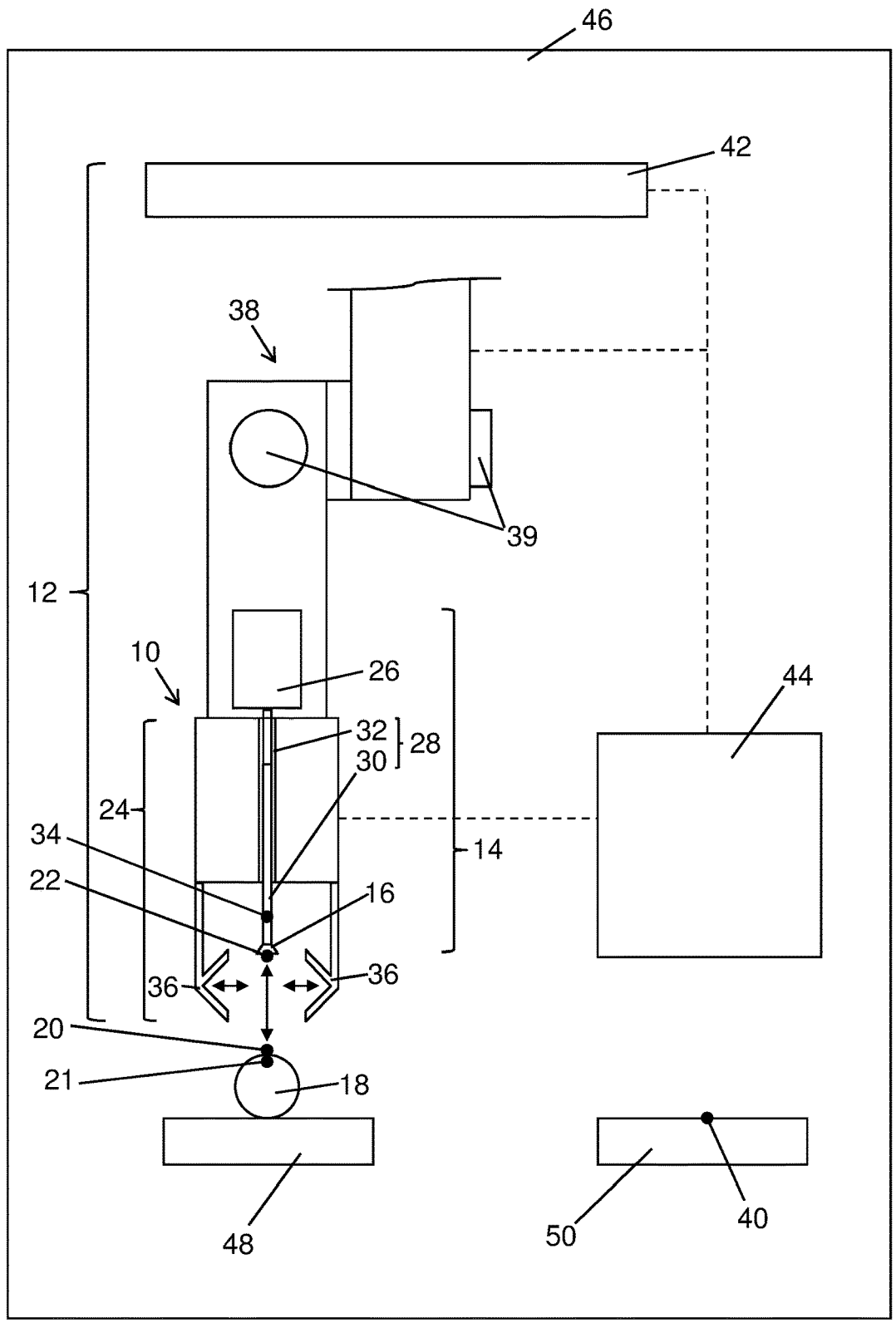
FIG. 1 shows a schematic view of a laboratory system in accordance with an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

The present disclosure relates to a gripper for a laboratory container sorting device. The gripper comprises a vacuum gripper comprising a suction cup. The vacuum gripper is configured to move the suction cup between a pickup position and a transfer position. The suction cup is configured to pick up a laboratory container when the suction cup is in the pickup position, to hold the laboratory container, and to transfer the laboratory container when the suction cup is in the transfer position. The gripper further comprises a mechanical gripper. The mechanical gripper is configured to grip and release the laboratory container when the suction cup is in the transfer position. The vacuum gripper comprises an extendable and retractable pipe with two ends. The suction cup is attached at one end and the vacuum source is operatively coupled to the other end. The extendable and retractable pipe is configured to be extended for moving the suction cup from the transfer position to the pickup position. The extendable and retractable pipe is configured to be retracted for moving the suction cup from the pickup position to the transfer position. The generated vacuum for holding the laboratory container is inside the extendable and retractable pipe and the extendable and retractable pipe is configured to be retracted by the vacuum inside the extendable and retractable pipe.

As used herein, the term "laboratory container" relates to a device adapted for receiving, storing, transporting, and/or releasing a content such as a test reagent (e.g., reagent for a histological test, immunochemistry test, clinical chemistry test, coagulation test, hematological test, or molecular biological test, etc.), a test sample (e.g., tissue, blood, urine, serum, plasma, or liquefied biopsy sample, etc.), or a laboratory consumable (e.g., pipette tip, cuvette, glass slide, micro-well plate, etc.). Thus, the laboratory container may be a test reagent container, test sample container, or a laboratory consumable container. The laboratory container may be a vessel with a cylindrical or cubic shape, a closed bottom, and an open top. The laboratory container may comprise a cap, closure, or lid which can be removable fitted on the open top of the laboratory container in order to protect the laboratory container content from the environment or to prevent spilling of the laboratory container content. The laboratory container may comprise a label such as, for example, a barcode or RFID tag for identification purposes. The material, the color (e.g., cap color), and/or the geometric form (e.g., shape, diameter, side length, height, etc.) of the laboratory container may vary depending on the content of the laboratory container, test sample processing steps to be performed, and/or manufacturer.

As used herein, the term "laboratory container sorting device" relates to a device being designed to transport, sort, and/or resort laboratory containers between at least two holding devices configured for receiving, holding, and/or releasing a laboratory container as further described below. The sorting/resorting may be based on laboratory container attributes in order to consolidate laboratory containers having a substantially same laboratory container attribute in a dedicated holding device. Depending on the substantially laboratory container attribute, the holding device in which the laboratory containers with the substantially laboratory container attribute are consolidated can be determined. For example, laboratory containers containing test samples of different test sample types are collected in a first holding device such as a bin. Subsequently, laboratory containers containing test samples of the same test sample type are sorted out of the bin and placed in or on a dedicated second holding device such as a laboratory container rack for further processing.

As used herein, the term "vacuum gripper" relates to a device for picking up, holding, and releasing laboratory containers by applying/abolishing an underpressure or vacuum. In one embodiment, the suction cup is made of elastic or flexible material configured to adapt to the surface of a laboratory container which may be flat or curved. In one embodiment, the vacuum gripper comprises one suction cup. In one embodiment, the suction cup is circular, oval, or rectangular. In one embodiment, the suction cup comprises a diameter smaller than the diameter of a laboratory container. In a specific embodiment, the diameter of the suction cup is in a range of 3 mm to 15 mm. In a more specific embodiment, the diameter of the suction cup is in a range of 5 mm to 10 mm. In one embodiment, the vacuum gripper comprises a vacuum source configured to generate an air suction through the suction cup for picking up the laboratory container, to generate an underpressure or vacuum for holding the laboratory container, and to abolish the underpressure or vacuum for releasing the laboratory container. The underpressure or vacuum for holding the laboratory container is generated as the suction cup is in contact with the laboratory container at the contact point of the laboratory container. In contrast to fingers of a mechanical gripper, the suction cup of the vacuum gripper has only one contact point or contact area with the laboratory container for picking up and holding the laboratory container. Therefore, the vacuum gripper can pick up a laboratory container at one contact point or from one side of the laboratory container without interfering with or touching surrounding or adjacent laboratory containers. For example, if a laboratory container is surrounded by or adjacent to other laboratory containers in a bin, the vacuum gripper can pick up a laboratory container from the top layer of laboratory containers without touching the other laboratory containers in the bin. This is advantageous as such interferences can damage surrounding or adjacent laboratory containers or change their positions or orientations.

As used herein, the term "mechanical gripper" relates to a device for gripping and releasing a laboratory container by mechanical forces using fingers. In contrast to the suction cup of the vacuum gripper, the fingers of the mechanical gripper require at least two contact points or contact areas with the laboratory container so that the laboratory container can be gripped when positioned between the mechanical fingers. However, the mechanical gripper can grip a laboratory container very tightly. Such a tight grip may be advantageous for an accurate aligning of the laboratory container with a holding device and/or for a secure insertion of the laboratory container into the holding device. In one embodiment, the mechanical gripper comprises two fingers located opposite each other. A laboratory container held by the suction cup is located between the two fingers when the suction cup is in the transfer position. Thus, the transfer position is located between the two fingers so that the two fingers of the mechanical gripper can grip the laboratory container when the suction cup is in the transfer position. In a more specific embodiment, the two fingers are bifurcated. One example of a bifurcated finger is a V-shaped or U-shaped finger which contacts the laboratory container at two separate contact points or areas. Bifurcated fingers may be advantageous for aligning a longitudinal axis of a cylindrical laboratory container with a vertical axis of a holding slot of a holding device. In another more specific embodiment, the fingers are flat clamps which contact the laboratory container at two opposite contact lines or contact areas. Flat clamps may be advantageous for aligning the longitudinal axis of a cubic laboratory container with a vertical axis of a holding slot of a holding device.

When the suction cup is in the pickup position and positioned at the contact point of the laboratory container, the vacuum gripper can pick up the laboratory container. As used herein, the term "contact point" relates to a part of the surface of the laboratory container where the suction cup of the vacuum gripper contacts the laboratory container for picking up the laboratory container. The contact point may be determined by the position, orientation, and/or geometric form of the laboratory container. Accordingly, the contact point may change when the position and/or the orientation of a laboratory container in or on a holding device changes. Furthermore, the contact point may be determined by the position, orientation, and/or geometric form of surrounding or adjacent laboratory containers. For example, surrounding or adjacent laboratory containers may positioned and oriented so that only a part of the surface of the laboratory container to be sorted is accessible for the suction cup of the vacuum gripper. Similarly, the contact point may be determined by the position, orientation, and/or geometric form of the holding device holding the laboratory container to be sorted.

As used herein, the term "transfer" means that the suction cup of the vacuum gripper releases the laboratory container after the mechanical gripper gripped the laboratory container. Thus, transfer or handover of a laboratory container from the vacuum gripper to the mechanical gripper comprises two phases. In a first phase, the vacuum gripper as well as the mechanical gripper hold the laboratory container. In a subsequent second phase, the vacuum gripper releases the laboratory container and the mechanical gripper still holds the laboratory container. Accordingly, the term "transfer position" relates to a position where the laboratory container is transferred or handed over from the vacuum gripper to the mechanical gripper. So, the vacuum gripper is configured to transfer or hand over the laboratory container to the mechanical gripper at the transfer position, wherein the mechanical gripper is configured to take over the laboratory container from the vacuum gripper at the transfer position. The vacuum gripper is configured to move the suction cup between the pickup position and the transfer position for bringing the laboratory container to the mechanical gripper after picking up the laboratory container. When the suction cup is at the transfer position, the picked up laboratory container is positioned between the two fingers so that the laboratory container can be gripped by the mechanical gripper and can be held by the vacuum gripper at the same time.

In one embodiment, the vacuum gripper comprises an extendable and retractable pipe with two ends. The suction cup is attached at one end and the vacuum source is operatively coupled to the other end. The extendable and retractable pipe is configured to be extended for moving the suction cup from the transfer position to the pickup position. The extendable and retractable pipe is configured to be retracted for moving the suction cup from the pickup position to the transfer position. So, the suction cup is moved from the transfer position to the pickup position by extending the extendable and retractable pipe and the suction cup is moved from the pickup position to the transfer position by retracting the extendable and retractable pipe. In one embodiment, the cross section of the extendable and retractable pipe is circular, oval, or rectangular.

In one embodiment, the vacuum gripper comprises a guiding element on which the extendable and retractable pipe is connected movably. The guiding element is adapted to guide the extension and retraction of the extendable and retractable pipe in order to move the suction cup between the pickup position and the transfer position. The vacuum gripper further comprises an actuator for moving the extendable and retractable pipe along the guiding element. In a specific embodiment, the actuator is an electric motor configured to move the extendable and retractable pipe along the guiding element. In another specific embodiment, the guiding element is a pneumatic cylinder configured to extend and retract the extendable and retractable pipe by air pressure in order to move the suction cup between the pickup position and the transfer position and the actuator is an air compressor configured to generate the air pressure. The extendable and retractable pipe may be made of one part and the whole pipe is extended out of the guiding element or retracted into the guiding element.

In another embodiment, the generated vacuum for holding the laboratory container is inside the extendable and retractable pipe and the extendable and retractable pipe is configured to be retracted by the vacuum inside the extendable and retractable pipe. Thus, no additional actuator for retracting the extendable and retractable pipe is required. In a specific embodiment, the extendable and retractable pipe is a telescopic pipe comprising a first pipe segment with the one end to which the suction cup is attached and a second pipe segment with the other end to which the vacuum source is operatively coupled. The first and second pipe segments are movable relative to each other for extending and retracting the pipe. The first pipe segment is configured to move towards the second pipe segment for retracting the extendable and retractable pipe when the vacuum is generated. So, the first pipe segment moves towards the second pipe segment for retracting the extendable and retractable pipe when the vacuum is generated. Accordingly, the second pipe segment functions as a guiding element adapted to guide the retraction of the first pipe segment in order to move the suction cup from the pickup position to the transfer position. The first and second pipe segment form an extendable and retractable pipe in which an underpressure or vacuum can be generated. In one embodiment, the first pipe segment is located inside the second pipe segment. Alternatively, the second pipe segment is located inside the first pipe segment.

In one embodiment, the extendable and retractable pipe is configured to be extended by gravity or by a spring force generated during retraction of the extendable and retractable pipe by a spring connecting the first and second pipe segment. Accordingly, no additional actuator for extending the extendable and retractable pipe is required. Like for the retraction of the first pipe segment, the second pipe segment also functions as a guiding element adapted to guide the extension of the first pipe segment in order to move the suction cup from the transfer position to the pickup position. In one embodiment, the extendable and retractable pipe comprises a locking mechanism configured to lock/unlock the first pipe segment when the suction cup is at the transfer position. For example, the first pipe segment is locked during positioning the gripper at the contact point of the laboratory container. The first pipe segment is then unlocked for moving the suction cup from the transfer position to the pickup position.

In one embodiment, the vacuum gripper is further configured to move the suction cup between the transfer position and a parking position. The mechanical gripper is further configured to grip and release a laboratory container when the suction cup is in the parking position. Thus, the mechanical gripper of the gripper can grip a laboratory container without prior picking up by the vacuum gripper. This might be advantageous when a laboratory container has to be sorted from a laboratory container rack to another laboratory container rack where the laboratory containers are vertically oriented or in an upright position in the laboratory container racks. Accordingly, the gripper enables sorting of laboratory containers between different holding device types where either a pick up by the vacuum gripper is required or not. For example, a pick up of the laboratory container may be required if the laboratory container to be sorted is surrounded by other laboratory containers in a bin. No pick up of the laboratory container to be sorted may be required if the laboratory container to be sorted is held in a laboratory container rack comprising individual vertical holding slots for each laboratory container which are spatially arranged so that the fingers of the mechanical gripper can grip the laboratory container without interfering or touching adjacent laboratory containers.

In one embodiment, the extendable and retractable pipe is configured to be further retracted for moving the suction cup from the transfer position to the parking position. The extendable and retractable pipe is configured to be extended for moving the suction cup from the parking position to the transfer position. So, the suction cup is moved from the transfer position to the parking position by further retracting the extendable and retractable pipe and the suction cup is moved from the parking position to the transfer position by extending the extendable and retractable pipe. In one embodiment, the vacuum gripper comprises a guiding element on which the extendable and retractable pipe is connected movably. The guiding element is adapted to guide the extension and retraction of the extendable and retractable pipe in order to move the suction cup between the pickup position and the transfer position as well as between the transfer position and the parking position. The vacuum gripper further comprises an actuator for moving the extendable and retractable pipe along the guiding element. In a specific embodiment, the actuator is an electric motor configured to move the extendable and retractable pipe along the guiding element. In another specific embodiment, the guiding element is a pneumatic cylinder configured to extend and retract the extendable and retractable pipe by air pressure in order to move the suction cup between the pickup position and the transfer position as well as between the transfer position and the parking position, wherein the actuator is an air compressor configured to generate the air pressure. In a more specific embodiment, the pneumatic cylinder is configured to extend and retract the extendable and retractable pipe to move the suction cup between the pickup position and the parking position. The pneumatic cylinder comprises a movable stop element configured to stop the extension and retraction of the extendable and retractable pipe so that the suction cup is stopped at the transfer position. The pneumatic cylinder may be configured to move the stop element between a stop position and a release position. In the stop position, the stop element stops the retraction or extension of the extendable and retractable pipe so that the suction cup is stopped at the transfer position. In the release position, the stop element enables the extendable and retractable pipe from retracting and extending. For example, for moving the suction cup from the pickup position to the transfer position the stop element is moved to the stop position. Then, the stop element is moved to the release position for further moving the suction cup from the transfer position to the parking position. Or for example, for moving the suction cup from the parking position to the transfer position the stop element is moved to the stop position. Then, the stop element is moved to the release position for further moving the suction cup from the transfer position to the pickup position.

The present disclosure also relates to a laboratory container sorting device. The laboratory container sorting device comprises a gripper as described herein and a cartesian positioning device. The gripper is attached to the cartesian positioning device and the cartesian positioning device is configured to position the gripper at a contact point of the laboratory container and at a release position. In one embodiment, the suction cup is in the transfer position while positioning the gripper at the contact point of the laboratory container so that there is a distance between the suction cup and the contact point after positioning the gripper. Then, the suction cup is moved from the transfer position to the pickup position by extending the extendable and retractable pipe. Thereby, the suction cup is positioned at the contact point of the laboratory container so that the suction cup contacts the laboratory container at the contact position for picking up the laboratory container. In an alternative embodiment, the suction cup is in the pickup position while positioning the gripper at the contact point of the laboratory container so that positioning of the gripper at the contact point of the laboratory container positions the suction cup at the contact point for picking up the laboratory container.

In one embodiment, the contact point and the release position are spatially separated from each other. For example, the laboratory container comprises a contact point when a first holding device holds the laboratory container. The release position is provided by a second holding device. And the first and second holding device are located at two different places of a laboratory system. After picking up the laboratory container held by the first holding device, the cartesian positioning device positions the gripper which holds the laboratory container at the release position of the second holding device. In one embodiment, the transfer or hand over of the laboratory container from the vacuum gripper to the mechanical gripper takes place before positioning the gripper at the release position. In an alternative embodiment, the transfer or hand over of the laboratory container from the vacuum gripper to the mechanical gripper takes place while positioning the gripper at the release position. By transferring the laboratory container and positioning the gripper at the release position at the same time, the time for sorting the laboratory container can be reduced.

In a specific embodiment, the cartesian positioning device is a robotic arm. The robotic arm is configured to position the gripper at the contact point of the laboratory container according to the position and orientation of the laboratory container. For example, the robotic arm comprises one or more pivot joints and/or one or more ball joints configured to pivot and/or turn the gripper so that that the gripper can be brought to any position or orientation. Accordingly, laboratory containers in any position or orientation can be picked up by the vacuum gripper of the gripper. For example, the laboratory container to be sorted may be in a horizontal orientation when held or located on a conveyer belt, in a vertical/upright orientation when held by a laboratory container rack, or in any possible orientation when held by or located in a bin. In one embodiment, the robotic arm is further configured to position the gripper at the contact point according to the geometric form of the laboratory container. In one embodiment, the robotic arm is configured to position the gripper at the release position, which may change over time. For example, the release position is provided by a movable holding device. Alternatively, the release position is a predefined position. For example, the release position is provided by a stationary holding device. Such robotic arms are well known in the art. A robotic arm may be designed as described in European Patent No. EP 2 148 204 B1, reference number 220 in FIGS. 1 to 2, reference number 320 in FIGS. 3 to 5, and corresponding description which is hereby incorporated by reference.

In one embodiment, the cartesian positioning device comprises at least one guide rail along each of the three directions x, y, and z of a three-dimensional rectangular coordinate system, wherein the gripper is movable in the x, y, and z direction along those guide rails by suitable drives. The guide rails and suitable drives are configured to position the gripper at the contact point according to the position and orientation of the laboratory container. In one embodiment, the guide rails and suitable drives are further configured to position the gripper at the contact point according to the geometric form of the laboratory container. In one embodiment, the guide rails and suitable drives are configured to position the gripper at the release position, which may change over time. For example, the release position is provided by a movable holding device. Alternatively, the release position is a predefined position. For example, the release position is provided by a stationary holding device.

In one embodiment, the laboratory container sorting device further comprises a camera system and a control unit communicatively connected to the camera system, gripper, and cartesian positioning device. The camera system is configured to acquire an image of the laboratory container. The control unit is configured to determine the position and the orientation of the laboratory container based on the acquired image. The control unit is configured to determine the contact point based on the determined position and orientation of the laboratory container.

In one embodiment, the control unit is further configured to control the cartesian positioning device to position the gripper at the contact point according to the determined position and orientation of the laboratory container.

In one embodiment, the control unit is further configured to determine a color (e.g., cap color) and/or a geometric form of the laboratory container based on the acquired image. In one embodiment, the contact point and/or the transfer position may be determined by the control unit based on the geometric form of the laboratory container. In one embodiment, the release position may be determined by the control unit based on the color and/or the geometric form of the laboratory container. In one embodiment, the control unit is further configured to determine a laboratory container type based on the determined color and/or geometric form. In one embodiment, the control unit comprises a memory device. Specific colors and/or geometric forms of laboratory containers for specific laboratory container types are stored in the memory device. The control unit compares the stored specific colors and/or geometric forms with the determined color and/or geometric form of the laboratory container for determining a specific laboratory container type. In an alternative embodiment, the control unit sends the determined color and/or geometric form of the laboratory container to a laboratory management unit communicatively connected to the control unit. The laboratory management unit comprises a memory device. Specific colors and/or the geometric forms of laboratory containers are stored in the memory device. The laboratory management unit compares the stored specific colors and/or geometric forms of laboratory containers with the received determined color and/or the geometric form of the laboratory container for determining a specific laboratory container type. And the laboratory management unit sends information about the specific laboratory container type to the control unit of the laboratory container sorting device. In one embodiment, the control unit is configured to determine the contact point and/or transfer position based on the determined laboratory container type. In one embodiment, the control unit is configured to determine the release position based on the determined laboratory container type. In one embodiment, the control unit is configured to the control unit controls the laboratory container sorting device to sort/resort the laboratory container based on the determined laboratory container type. For example, laboratory containers of the same type are sorted into a dedicated holding device, e.g., laboratory containers with a substantially same cap color are sorted into the dedicated holding device.

In one embodiment, the control unit is further configured to detect a label attached to the laboratory container based on the acquired image. The attached label may be a barcode. In an alternative embodiment, the attached label may be a RFID tag and the laboratory container sorting device comprises an RFID reader communicatively connected to the control unit. The RFID reader is configured to read information or data stored on the RFID tag. The control unit is further configured to determine a laboratory container attribute associated with the attached label. As used herein the term "laboratory container attribute" relates to a unique laboratory container identity and/or characteristics of the laboratory container, characteristics of the laboratory container content, and/or information associated with the laboratory container. Characteristics of the laboratory container are, as non-limiting examples, color and/or geometric form of laboratory container. Characteristics of the laboratory container content are, as non-limiting examples, test sample type, test sample expiration date, test sample weight, test sample volume, test orders, test reagent type, test reagent expiration date, test reagent weight, test reagent volume, laboratory consumable type, laboratory consumable expiration date, laboratory consumable weight, or number of laboratory consumables. Information associated with the laboratory container are, as non-limiting examples, information about already conducted or planned laboratory container handling steps like storing, retrieving, and/or wasting of laboratory containers. As used herein the term "substantially same laboratory container attribute" relates to a laboratory container attribute of at least two laboratory containers which is either equal or similar. In one embodiment, the control unit is configured to determine the release position based on the determined laboratory container attribute. For example, laboratory containers containing test samples of the same test sample type or test samples with the same test orders are sorted into determined release positions of a dedicated holding device.

In one embodiment, the control unit is configured to control the cartesian positioning device to position the gripper at a contact point of the laboratory container, to control the vacuum gripper to move the suction cup from the transfer position to the pickup position, to control the vacuum source to generate an air suction through the suction cup for picking up the laboratory container, to control the vacuum source to generate an underpressure or vacuum for holding the laboratory container, to control the vacuum gripper to move the suction cup from the pickup position to the transfer position, to control the mechanical gripper to grip the laboratory container when the suction cup is in the transfer position, to control the vacuum source to abolish the underpressure or vacuum for releasing the laboratory container, to control the cartesian positioning device to position the gripper at a release position, and to control the mechanical gripper to release the laboratory container at the release position.

In one embodiment, the control unit controls the cartesian positioning device to align the longitudinal axis of a cylindrical or cubic laboratory container with the vertical axis of a holding slot of a holding device and/or to insert the cylindrical or cubic laboratory container into the holding slot of the holding device before releasing the laboratory container at the release position.

In one embodiment, the camera system is configured to acquire an image of a holding device. The control unit is configured to determine a release position provided by the holding device based on the acquired image. For example, the holding device comprises multiple holding positions or slots and the control unit determines based on the acquired image which of the multiple holding positions or slots are free/not occupied by other laboratory containers for determining the release position.

The present disclosure further relates to a laboratory system comprising a laboratory container sorting device as described herein, a laboratory container, a first holding device configured for receiving, holding, and/or releasing the laboratory container, and a second holding device configured for receiving, holding, and/or releasing the laboratory container. The laboratory container comprises the contact point when the first holding device holds the laboratory container. The second holding device provides the release position. For example, the release position may be a holding position or holding slot of a laboratory carrier (e.g., a holding slot of a laboratory container rack), a position in or over a bin, or a holding position on a conveyor belt. If the release position is a position over a bin, the gripper may be positioned above the bin for releasing the laboratory container so that the laboratory container drops into the bin after releasing the laboratory container.

In one embodiment, the laboratory container is a test reagent container configured for receiving, holding, transporting, and/or releasing a test reagent, a test sample container configured for receiving, holding, transporting, and/or releasing a test sample, or a consumable container configured for receiving, holding, transporting, and/or releasing a laboratory consumable.

In one embodiment, the first holding device is a bin, a conveyor belt, or a laboratory carrier. The second holding device is a bin, a conveyor belt, or a laboratory carrier. As used herein, the term "bin" relates to a box, receptacle or compartment for receiving, holding, and/or releasing a laboratory container. Typically, a bin has a cubic shape with sidewalls, a closed bottom, and an open top. Laboratory containers may be dropped or placed into the bin and can take any position and/or orientation in the bin. In one embodiment, the bin comprises a cover or lid which can be removable fitted on the open top of the bin in order to protect laboratory containers from the environment. In one embodiment, the bin is further configured to transport laboratory containers, e.g., the bin comprises wheels. In one embodiment, the bin is comprised by a device configured for bulk-loading laboratory containers into a laboratory station, e.g., pre-analytical, analytical or post-analytical station.

As used herein, the term "conveyor belt" relates to a transport system for distributing laboratory containers to connected pre-analytical stations, analytical stations, or post-analytical stations of a laboratory environment. The conveyor belt comprises a surface on which a laboratory container can be released or placed. In one embodiment, the surface of the conveyor belt comprises predefined holding positions on which laboratory containers can be released.

As used herein, the term "laboratory carrier" relates to a cylindrical or cubic device comprising a closed bottom and an open top with one or multiple holding positions or holding slots for inserting one or multiple laboratory containers in an upright position. In one embodiment, the laboratory carrier is a laboratory container rack comprising one or more holding slots. In a more specific embodiment, the one or more holding slots comprise a flexible adapter configured to receive laboratory containers of different dimensions. The laboratory container rack may be configured for manual or automated transport. In another embodiment, the laboratory carrier is a transport carrier further configured to transport a laboratory container on a transport surface of a laboratory transport system. In a more specific embodiment, the transport carrier comprises at least one magnetically active device which interacts with a magnetic field so that a magnetic force is applied to the transport carrier in order to move the laboratory container carrier on the transport surface. A laboratory container carrier comprising at least one magnetically active device which interacts with a magnetic field and a bottom plate for sliding over the transport surface is well known in the art and may be designed as described in European Patent No. EP 2 988 134 A1 reference number 10 in FIG. 1 and corresponding description which is hereby incorporated by reference, or as described in European Patent No. EP 3 070 479 A1 reference 1 in FIGS. 1, 2, and 3 and corresponding description which is hereby incorporated by reference. The laboratory transport system comprises a number of electro-magnetic actuators being stationary arranged below the transport surface and adapted to generate magnetic fields to move the transport carrier. Such a transport system is well known in the art and may be designed as described in European Patent No. EP 2 566 787 B1 reference 100 in FIG. 1 and corresponding description which is hereby incorporated by reference. In an alternative embodiment, the transport system comprises a stable transport surface on which self-propelled transport carriers can move. For example, the transport carrier comprises wheels for moving on the stable transport surface.

In one embodiment, the first and second holding devices are located at two different places of the laboratory system. For example, the first holding device may be located at an input area of the laboratory system and the second holding device may be located at an output area of the laboratory system. The input area may be a predefined place and configured for receiving, holding, and/or releasing the first holding device. The input area may comprise holding positions or holding slots for holding the first holding device. The output area may be a predefined place and configured for receiving, holding, and/or releasing the second holding device. The output area may comprise holding positions or holding slots for holding the second holding device.

In one embodiment, the first holding device type and the second holding device type are the same. For example, both holding devices are laboratory container racks and the laboratory container sorting device is able to sort/resort laboratory containers between the two laboratory container racks. In another embodiment, the first holding device type is different from the second holding device type. For example, the first holding device is a bin and the second holding device is a laboratory container rack and the laboratory container sorting device is able to sort/resort laboratory containers from the bin to the laboratory container rack. However, any combination of holding device types is possible.

In one embodiment, the laboratory system comprises a third holding device configured for receiving, holding, and/or releasing the laboratory container. The laboratory container comprises the contact point when the third holding device holds the laboratory container or the third holding device provides the release position. In one embodiment, the third holding device is a bin, a conveyor belt, or a laboratory carrier. The laboratory container sorting device may be configured to sort laboratory containers from the first and third holding device to the second holding device. For example, laboratory containers from multiple bins may be sorted to or consolidated in one holding device. Or the laboratory system may be configured to sort laboratory containers from the first holding device to the second and third holding device. For example, laboratory containers are distributed from one bin to two holding devices.

The present disclosure further relates to a method of operating a laboratory system as described herein. The method comprises the following steps:
 a) positioning, by the cartesian positioning device, the gripper at the contact point of the laboratory container held by the first holding device,
 b) moving, by the vacuum gripper, the suction cup to the pickup position, wherein the suction cup is positioned at the contact point of the laboratory container during step b) if step b) is executed after step a), wherein the suction cup is positioned at the contact point of the laboratory container during step a) if step b) is executed before step a),
 c) picking up, by the suction cup of the vacuum gripper, the laboratory container at the contact point,
 d) moving, by the vacuum gripper, the suction cup to the transfer position,
 e) gripping, by the mechanical gripper, the laboratory container when the suction cup is in the transfer position,
 f) releasing, by the vacuum gripper, the laboratory container,
 g) positioning, by the cartesian positioning device, the gripper at the release position of the second holding device, and
 h) releasing, by the mechanical gripper, the laboratory container.

In one embodiment, the method comprises the following steps prior to step a):
 acquiring, by the camera system, an image of the laboratory container,
 determining, by control unit, the position and the orientation of the laboratory container, and
 determining, by the control unit, the contact point based on the determined position and orientation of the laboratory container.

In one embodiment, the method comprises the following steps prior to step a):
 determining, by the control unit, the geometric form of the laboratory container based on the acquired image, and
 determining, by the control unit, the contact point and/or the transfer position based on the determined geometric form of the laboratory container type.

Optionally, the control unit further determines a laboratory container type based on the determined geometric form. The contact point and/or the transfer position is determined by the control unit based on the determined laboratory container type.

In one embodiment, the method comprises the following step prior to step a):
 determining, by the control unit, the color of the laboratory container based on the acquired image, and
 determining, by the control unit, a laboratory container type based on the determined color, and
 determining, by the control unit, the contact point and/or the transfer position based on the determined laboratory container type.

For example, the laboratory container comprises a cap. The color of the cap is determined by the control unit based on the acquired image. And the control unit determines a laboratory container type based on the determined cap color. The determined laboratory container type comprises a certain laboratory container diameter that is used to determine the contact point. The laboratory container diameter is also used to determine the transfer position so that the laboratory container is accurately positioned between the two fingers of the mechanical gripper when the suction cup is in the transfer position.

In one embodiment, the method comprises the following steps prior to step g):
determining, by the control unit, the color and/or the geometric form of the laboratory container based on the acquired image, and
determining, by the control unit, the release position based on the determined color and/or geometric form.

Optionally, the control unit further determines a laboratory container type based on the determined color and/or geometric form. The release position is determined by the control unit based on the determined laboratory container type. For example, the laboratory container comprises a cap. The color of the cap is determined by the control unit based on the acquired image. The control unit determines a laboratory container type based on the determined cap color. The laboratory container is released at a release position of a dedicated second holding device so that laboratory containers with the same cap color are sorted into the dedicated second holding device.

In one embodiment, the method further comprises the following steps prior to step g):
detecting, by the control unit, a label attached to the laboratory container based on the acquired image, and
determining, by the control unit, a laboratory container attribute associated with the attached label.

For example, the determined laboratory container attribute is a unique laboratory container identity for identifying the laboratory container.

In one embodiment, the method comprises the following steps prior to step g):
detecting, by the control unit, a label attached to the laboratory container based on the acquired image,
determining, by the control unit, a laboratory container attribute associated with the attached label, and
determining, by the control unit, the release position based on the determined laboratory container attribute.

For example, the determined laboratory container attribute is a characteristic of the laboratory container, characteristic of the laboratory container content, and/or information associated with the laboratory container. The laboratory container is released at a release position of a dedicated second holding device so that laboratory containers of the same or substantially same characteristic and/or information associated with the laboratory container are sorted into the dedicated second holding device.

In one embodiment, the cartesian positioning device aligns the longitudinal axis of a cylindrical or cubic laboratory container with the vertical axis of a holding slot of a second holding device and/or inserts the cylindrical or cubic laboratory container into the holding slot of the second device before releasing the laboratory container at the release position in step h). For example, the second holding device is a laboratory container rack comprising vertical holding slots with vertical axes and laboratory containers are inserted into the vertical holding slots.

In order that the embodiments of the present disclosure may be more readily understood, reference is made to the following examples, which are intended to illustrate the disclosure, but not limit the scope thereof.

FIG. 1 shows a schematic view of an embodiment of a laboratory system (46). The shown laboratory system (46) comprises a laboratory container sorting device (12), a laboratory container (18), a first holding device (48) configured for receiving, holding, and/or releasing the laboratory container (18), and a second holding device (50) configured for receiving, holding, and/or releasing the laboratory container. The shown laboratory carrier (18) is cylindrical and comprises a circular cross section and a longitudinal axis extending into the plane of projection of FIG. 1. The shown laboratory carrier (18) is held by the first holding device (48) and comprises a contact point (21). The first holding device (48) may be a bin, a conveyor belt, or a laboratory carrier. The second holding device (50) is located at a different place of the laboratory system (46) and provides a release position (40). The second holding device (50) may also be a bin, a conveyor belt, or a laboratory carrier.

The laboratory container sorting device (12) comprises a gripper (10) and a cartesian positioning device (38). The gripper (10) is attached to the cartesian positioning device (38). The cartesian positioning device (38) is configured to position the gripper (10) at the contact point (21) of the laboratory container (18) and at the release position (40) of the second holding device (50). In the shown embodiment, the cartesian positioning device (38) is a robotic arm configured to position the gripper (10) at the contact point (21) of the laboratory container (18) according to the position and orientation of the laboratory container (18). For example, the robotic arm comprises pivot joints (39) configured to pivot the gripper (10) so that that the gripper (10) can be brought to any position or orientation. As shown in FIG. 1, the laboratory container sorting device (12) may further comprise a camera system (42) and a control unit (44) communicatively connected to the camera system (42), gripper (10), and cartesian positioning device (38) as indicated by dashed lines. The camera system (42) is configured to acquire an image of the laboratory container (18), the first holding device (48), and/or the second holding device (50). The control unit (44) is configured to determine the position and the orientation of the laboratory container (18) held by the first holding device (48) based on the acquired image. The control unit (44) is further configured to determine the contact point (21) based on the determined position and orientation of the laboratory container (18).

As further shown in FIG. 1, the gripper (10) comprises a vacuum gripper (14) and a mechanical gripper (24). The vacuum gripper (14) comprises a suction cup (16) and is configured to move the suction cup (16) between a pickup position (20) and a transfer position (22) as indicated by a vertical double arrow in FIG. 1 and further shown in FIGS. 2A-2C. The suction cup (16) is configured to pick up the laboratory container (18) when the suction cup (16) is in the pickup position (20), to hold the laboratory container (18), and to transfer the laboratory container (18) when the suction cup is in the transfer position (22). The vacuum gripper (14) comprises a vacuum source (26) configured to generate an air suction through the suction cup (16) for picking up the laboratory container (18), to generate a underpressure or vacuum for holding the laboratory container (18), and to abolish the underpressure or vacuum for releasing the laboratory container (18). The shown vacuum gripper (14) comprises an extendable and retractable pipe (28) with two ends. The suction cup (16) is attached at one end of the extendable and retractable pipe and the vacuum source (26) is operatively coupled to the other end of the extendable and retractable pipe (28). In the shown embodiment, the extendable and retractable pipe (28) of the vacuum gripper (14) is a telescopic pipe (28) comprising a first pipe segment (30) with the one end to which the suction cup (16) is attached and a second pipe segment (32) with the other end to which the vacuum source (26) is operatively coupled. The first and second pipe segments (30, 32) are movable relative to each other for extending and retracting the extendable and retractable pipe (28). As shown in FIGS. 2A-2C, the suction cup (16) is moved from the transfer position (22) to the pickup position (20) by extending the extendable and retractable pipe (28) and the suction cup (16) is moved from the pickup position (20) to the transfer position (22) by retracting the extendable and retractable pipe (28). The shown vacuum gripper (14) is further configured to move the suction cup (16) between the transfer position (22) and a parking position (34).

The mechanical gripper (24) of the gripper (10) is configured to grip and release the laboratory container (18) when the suction cup (16) is in the transfer position (22) as indicated by two horizontal double arrows in FIG. 1. The shown mechanical gripper (24) comprises two bifurcated fingers (36) located opposite each other so that the two bifurcated fingers (36) can grip the laboratory container (18) when the suction cup (16) is in the transfer position (22) as shown in FIG. 2D.

Figure 2:
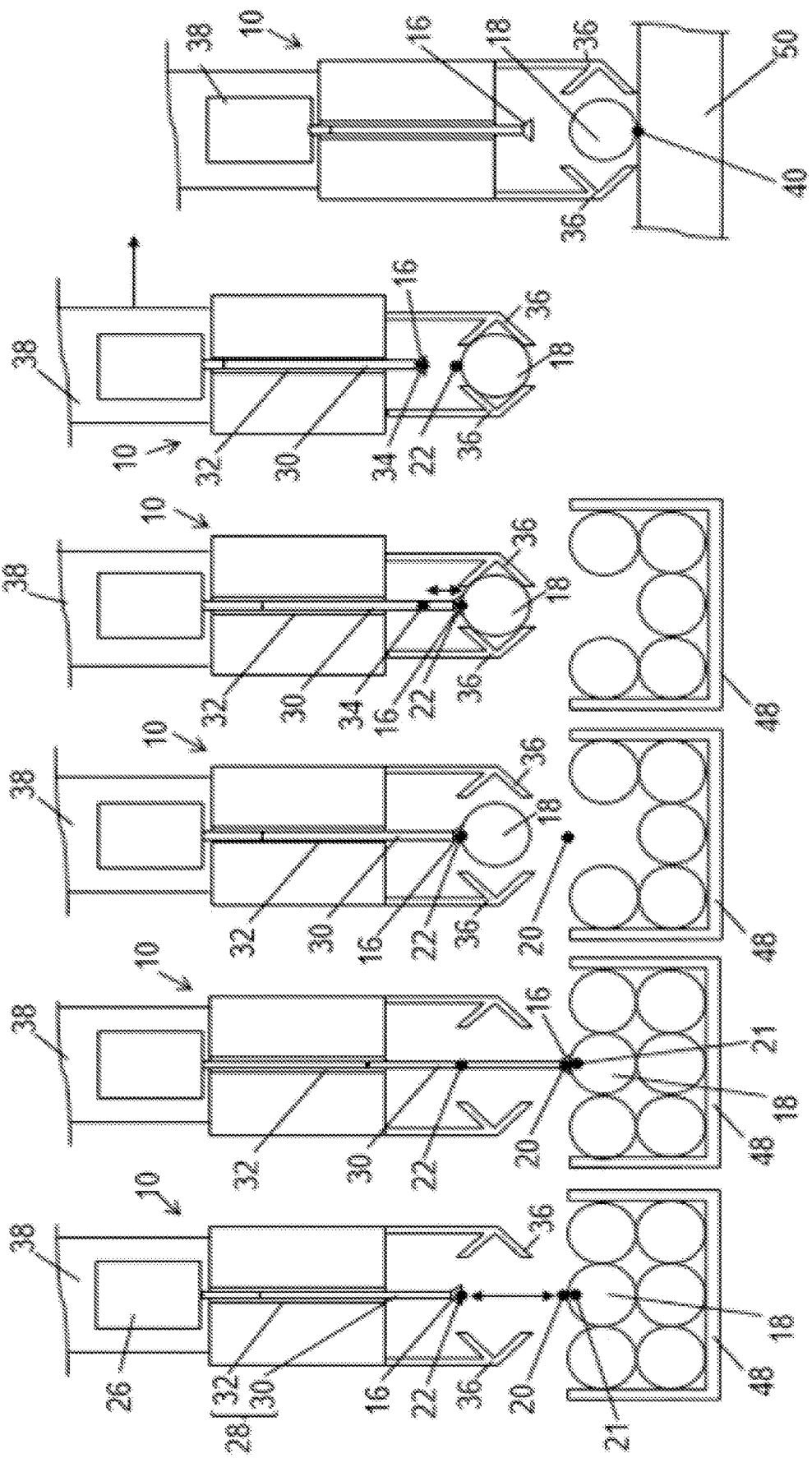
FIGS. 2A to 2F depict a sequence of schematic side views of a laboratory system during operation in accordance with an embodiment of the present disclosure.

FIGS. 2A-2F depict a sequence of schematic side views of the embodiment of the laboratory system (46) as shown in FIG. 1 during sorting a cylindrical laboratory carrier (18) from a first holding device (48) to a second holding device (50). In FIG. 2A, the cylindrical laboratory carrier (18) to be sorted comprises a contact point (21) and is held with five other identical cylindrical laboratory containers by the first holding device (48) which is a bin. In the shown embodiment, the longitudinal axes of the six cylindrical laboratory containers are parallel to each other and extend into the plane of projection of FIG. 2. However, a laboratory container can have any geometric form or orientation in the bin. As the laboratory carrier (18) to be sorted is located in between two adjacent laboratory carriers, the laboratory container (16) cannot be gripped by the two bifurcated fingers (36) of the a mechanical gripper (24) without interfering with the two adjacent laboratory containers.

FIGS. 2A-2F show the same gripper (10) attached to the cartesian positioning device (38) as shown in FIG. 1. In a first step, the cartesian positioning device (38) positions the gripper (10) at the contact point (21) of the laboratory container (18) held by the first holding device (48) as shown in FIG. 2A. In the shown embodiment, the suction cup (16) is in the transfer position (22) while positioning the gripper (10) at the contact point (21) of the laboratory container (18) so that there is a distance between the suction cup (16) and the contact point (21) after positioning the gripper (10). Then, the suction cup (16) is moved from the transfer position (22) to the pickup position (20) by extending the extendable and retractable pipe (28). Thereby, the suction cup (16) is positioned at the contact point (21) of the laboratory container (18) so that the suction cup (16) contacts the laboratory container (18) at the contact position (21) as shown in FIG. 2B. In an alternative embodiment, the suction cup (16) is in the pickup position (20) while positioning the gripper (10) at the contact point (21) of the laboratory container (18) so that positioning of the gripper (10) at the contact point (21) of the laboratory container (18) positions the suction cup (16) at the contact point (21) of the laboratory container (18). As soon as the suction cup (16) is in contact with the laboratory container (18), the vacuum source (26) generates an air suction through the suction cup (16) for picking up the laboratory container (18). An underpressure or vacuum for holding the laboratory container (18) is generated as the suction cup (16) is in contact with the laboratory container (18). In the shown embodiment, the generated vacuum for holding the laboratory container (18) is inside the extendable and retractable pipe (28) resulting in a retraction of the extendable and retractable pipe thereby moving the suction cup (16) from the pickup position (20) to the transfer position (22) as shown in FIG. 2C. When the suction cup (16) is in the transfer position (22), the laboratory container (18) held by the suction cup (16) is located between the two fingers (36) of the mechanical gripper (24). As shown in FIG. 2D, for transferring or handing over the laboratory container (18) from the vacuum gripper (14) to the mechanical gripper (24), the mechanical gripper (24) grips the laboratory container (18) with its two fingers (18) and the vacuum gripper (14) releases the laboratory container (18) by abolishing the underpressure or vacuum inside the extendable and retractable pipe (28). Afterwards, the cartesian positioning device (38) positions the gripper (10) with the laboratory container (18) at a release position (40) provided by the second holding device (50) as indicated by an horizontal arrow in FIG. 2E. In the shown example, the second holding means (50) is a conveyor belt on which the laboratory container (18) is released by the two fingers (26) of the mechanical gripper (24) as shown in FIG. 2F.

As further shown in FIG. 2D, the shown vacuum gripper (14) is configured to move the suction cup (16) between the transfer position (22) and a parking position (34) as indicated by a double arrow. Optionally, the suction cup (16) can be positioned at the parking position (34) when the cartesian positioning device (38) positions the gripper (10) at the release position (40) as shown in FIG. 2E.

Figure 3:
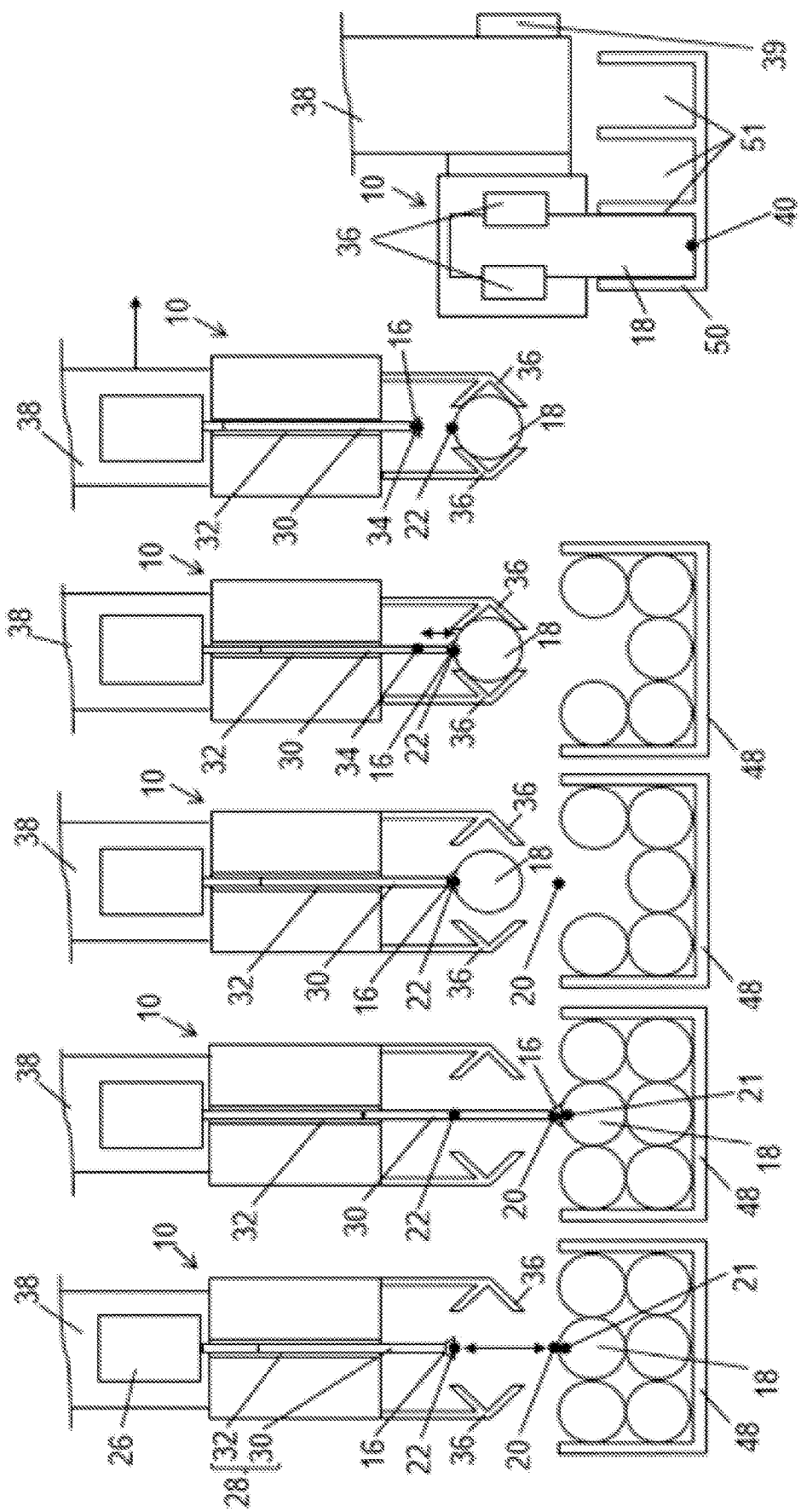
FIGS. 3A to 3F show another sequence of schematic side views of a laboratory system during operation in accordance with an embodiment of the present disclosure.

FIGS. 3A-3F depict another sequence of schematic side views of the embodiment of the laboratory system (46) as shown in FIG. 1 during sorting a cylindrical laboratory carrier (18) from a first holding device (48) to a second holding device (50). FIGS. 3A-3E show the same sequence of schematic side views as shown in FIGS. 2A-2E. However, in the shown example of FIG. 3, the second holding means (50) is a laboratory container rack (50). The shown laboratory container rack (50) comprises three vertical holding slots (51) with vertical axes extending parallel to the plane of projection of FIG. 3. The shown release position (40) is located in the first holding slot (51) of the laboratory container rack. As shown in FIG. 3F, the cartesian positioning device (38) aligns the longitudinal axis of the cylindrical laboratory container (18) with the vertical axis of the holding slot (51) providing the release position (40) and inserts the cylindrical laboratory container (18) into the holding slot (51) before releasing the laboratory container (18) at the release position (40). For example, the cartesian positioning device (38) comprises a pivot joint (39) configured to pivot the gripper so that that the longitudinal axis of the cylindrical laboratory container (18) can be pivoted from a non-vertical to a vertical orientation. In FIG. 3F, the fingers (36) of the mechanical gripper (24) still hold the cylindrical laboratory container (18) and the cylindrical laboratory container (18) is not yet released at the release position (40).

Figure 4:
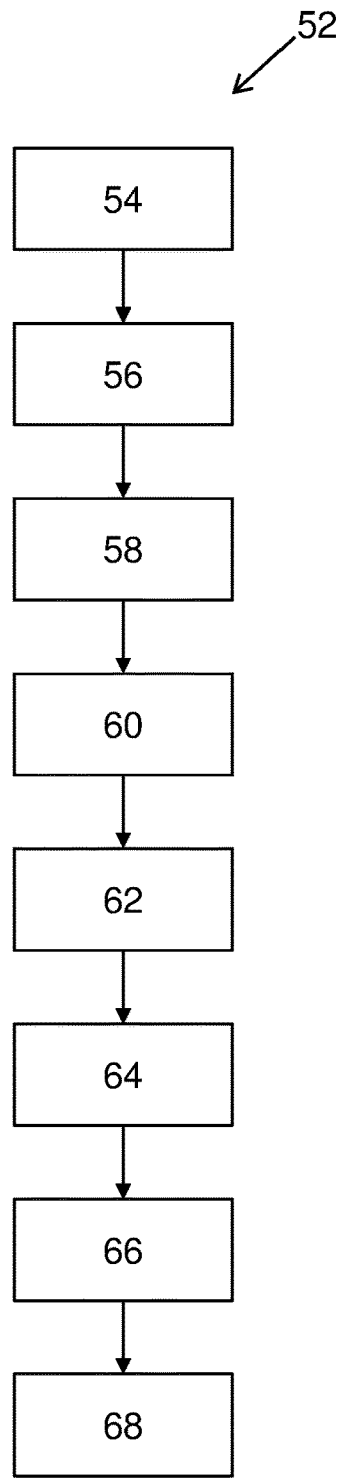
FIG. 4 shows a flowchart of an embodiment of a method of operating an embodiment of a laboratory system in accordance with the present disclosure.

FIG. 4 shows a flowchart of an embodiment of a method (52) of operating the embodiment of the laboratory system (46) as shown in FIG. 1. In step a) (54) of the method (52), the cartesian positioning device (38) positions the gripper (10) at the contact point (21) of the laboratory container (18) held by the first holding device (48). In step b) (56) of the method (52), the vacuum gripper (14) moves the suction cup (16) to the pickup position (20). The suction cup (16) is positioned at the contact point (21) of the laboratory container (18) during step b) (56) if step b) (56) is executed after step a) (54) as shown in FIG. 4. Alternatively, the suction cup (16) is positioned at the contact point (21) of the laboratory container (18) during step a) (54) if step b) (56) is executed before step a) (54). Then, the suction cup (16) of the vacuum gripper (14) picks up the laboratory container at the contact point (21) in step c) (58) of the method (52). In step d) (60) of the method (52), the vacuum gripper (14) moves the suction cup (16) to the transfer position (22). When the suction cup (16) is in the transfer position (22), the mechanical gripper (24) grips the laboratory container (18) in step e) (62) of the method (52). In step f) (64) of the method (52), the vacuum gripper (14) releases the laboratory container (18). The cartesian positioning device (38) positions the gripper (10) at the release position (40) of the second holding device (50) in step g) (66) of the method (52). Finally, the mechanical gripper (24) releases the laboratory container in step h) (68) of the method (52).

In the preceding description and figures, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this description are not necessarily all referring to the same embodiment or example.

LIST OF REFERENCE NUMBERS

10 gripper
12 laboratory container sorting device
14 vacuum gripper
16 suction cup
18 laboratory container
20 pickup position
21 contact point
22 transfer position
24 mechanical gripper
26 vacuum source
28 extendable and retractable pipe
30 first pipe segment
32 second pipe segment
34 parking position
36 fingers of mechanical gripper
38 cartesian positioning device
39 pivot joint
40 release position
42 camera system
44 control unit
46 laboratory system
48 first holding device
50 second holding device
51 holding slots
52 method
54 step a) of the method
56 step b) of the method
58 step c) of the method
60 step d) of the method
62 step e) of the method
64 step f) of the method
66 step g) of the method
68 step h) of the method

What is claimed is:

1. A gripper for a laboratory container sorting device comprising:
a vacuum gripper comprising a suction cup, wherein the vacuum gripper is configured to move the suction cup between a pickup position and a transfer position, wherein the suction cup is configured to pick up a laboratory container when the suction cup is in the pickup position, to hold the laboratory container, and to transfer the laboratory container when the suction cup is in the transfer position,
a mechanical gripper, wherein the mechanical gripper is configured to grip and release the laboratory container when the suction cup is in the transfer position,
wherein the vacuum gripper comprises an extendable and retractable pipe with two ends, wherein the suction cup is attached at one end and a vacuum source is operatively coupled to the other end, wherein the extendable and retractable pipe is configured to be extended for moving the suction cup from the transfer position to the pickup position, wherein the extendable and retractable pipe is configured to be retracted for moving the suction cup from the pickup position to the transfer position, wherein the generated vacuum for holding the laboratory container is inside the extendable and retractable pipe, and wherein the extendable and retractable pipe is configured to be retracted by the vacuum inside the extendable and retractable pipe.

2. The gripper for a laboratory container sorting device according to claim 1, wherein the vacuum gripper comprises the vacuum source being configured to generate an air suction through the suction cup for picking up the laboratory container, to generate an underpressure or vacuum for holding the laboratory container, and to abolish the underpressure or vacuum for releasing the laboratory container.

3. The gripper for a laboratory container sorting device according to claim 1, wherein the extendable and retractable pipe is a telescopic pipe comprising a first pipe segment with the one end to which the suction cup is attached, and a second pipe segment with the other end to which the vacuum source is operatively coupled, wherein the first and second pipe segments are movable relative to each other for extending and retracting the extendable and retractable pipe, wherein the first pipe segment is configured to move towards the second pipe segment for retracting the extendable and retractable pipe when the vacuum is generated.

4. The gripper for a laboratory container sorting device according to claim 1, wherein the extendable and retractable pipe is configured to be extended by gravity.

5. The gripper for a laboratory container sorting device according to claim 1, wherein the vacuum gripper is further configured to move the suction cup between the transfer position and a parking position, wherein the mechanical gripper is further configured to grip and release a laboratory container when the suction cup is in the parking position.

6. The gripper for a laboratory container sorting device according to claim 5, wherein the extendable and retractable pipe is configured to be further retracted for moving the suction cup from the transfer position to the parking position, wherein the extendable and retractable pipe is configured to be extended for moving the suction cup from the parking position to the transfer position.

7. The gripper for a laboratory container sorting device according to claim 1, wherein the mechanical gripper comprises two fingers located opposite each other, wherein the laboratory container held by the suction cup is located between the two fingers when the suction cup is in the transfer position.

8. A laboratory container sorting device comprising:
a gripper according to claim 1, and
a cartesian positioning device, wherein the gripper is attached to the cartesian positioning device, wherein the cartesian positioning device is configured to position the gripper at a contact point of the laboratory container and at a release position.

9. The laboratory container sorting device according to claim 8, wherein the cartesian positioning device is a robotic arm, and wherein the robotic arm is configured to position the gripper at the contact point of the laboratory container according to the position and orientation of the laboratory container.

10. The laboratory container sorting device according to claim 8, wherein the laboratory container sorting device further comprises a camera system and a control unit communicatively connected to the camera system, gripper, and cartesian positioning device, wherein the camera system is configured to acquire an image of the laboratory container, wherein the control unit is configured to determine the position and the orientation of the laboratory container based on the acquired image, and wherein the control unit is configured to determine the contact point based on the determined position and orientation of the laboratory container.

11. A laboratory system comprising:
a laboratory container sorting device according to claim 8,
a laboratory container,
a first holding device configured for receiving, holding, and/or releasing the laboratory container, and
a second holding device configured for receiving, holding, and/or releasing the laboratory container,
wherein the laboratory container comprises the contact point when the first holding device holds the laboratory container, wherein the second holding device provides the release position.

12. The laboratory system according to claim 11, wherein the first holding device type is different from the second holding device type.

13. The gripper for a laboratory container sorting device according to claim 1, wherein no additional actuator is used for retracting the extendable and retractable pipe.

14. A method of operating a laboratory system, the laboratory system comprising:
a laboratory container sorting device,
a laboratory container,
a first holding device configured for receiving, holding, and/or releasing the laboratory container, and
a second holding device configured for receiving, holding, and/or releasing the laboratory container,
the laboratory container sorting device comprising a gripper and a cartesian positioning device,
the gripper comprising a vacuum gripper comprising a suction cup, wherein the vacuum gripper is configured to move the suction cup between a pickup position and a transfer position, wherein the suction cup is configured to pick up a laboratory container when the suction cup is in the pickup position, to hold the laboratory container, and to transfer the laboratory container when the suction cup is in the transfer position,
a mechanical gripper, wherein the mechanical gripper is configured to grip and release the laboratory container when the suction cup is in the transfer position,
wherein the vacuum gripper comprises an extendable and retractable pipe with two ends, wherein the suction cup is attached at one end and a vacuum source is operatively coupled to the other end,
wherein the extendable and retractable pipe is configured to be extended for moving the suction cup from the transfer position to the pickup position,
wherein the extendable and retractable pipe is configured to be retracted for moving the suction cup from the pickup position to the transfer position,
wherein the generated vacuum for holding the laboratory container is inside the extendable and retractable pipe, wherein the extendable and retractable pipe is configured to be retracted by the vacuum inside the extendable and retractable pipe, and
wherein the gripper is attached to the cartesian positioning device, wherein the cartesian positioning device is configured to position the gripper at a contact point of the laboratory container and at a release position
wherein the laboratory container comprises the contact point when the first holding device holds the laboratory container, wherein the second holding device provides the release position,
the method comprising:
a) positioning, by the cartesian positioning device, the gripper at the contact point of the laboratory container held by the first holding device;
b) moving, by the vacuum gripper, the suction cup to the pickup position,
c) wherein the suction cup is positioned at the contact point of the laboratory container during step b) if step b) is executed after step a), wherein the suction cup is positioned at the contact point of the laboratory container during step a) if step b) is executed before step a);
d) picking up, by the suction cup of the vacuum gripper, the laboratory container at the contact point;
e) moving, by the vacuum gripper, the suction cup to the transfer position;
f) gripping, by the mechanical gripper, the laboratory container when the suction cup is in the transfer position;
g) releasing, by the vacuum gripper, the laboratory container;
h) positioning, by the cartesian positioning device, the gripper at the release position of the second holding device; and
i) releasing, by the mechanical gripper, the laboratory container.

* * * * *